A. A. CROZIER.
PROCESS FOR MAKING PNEUMATIC TIRES.
APPLICATION FILED MAR. 7, 1917.
1,315,710.
Patented Sept. 9, 1919.
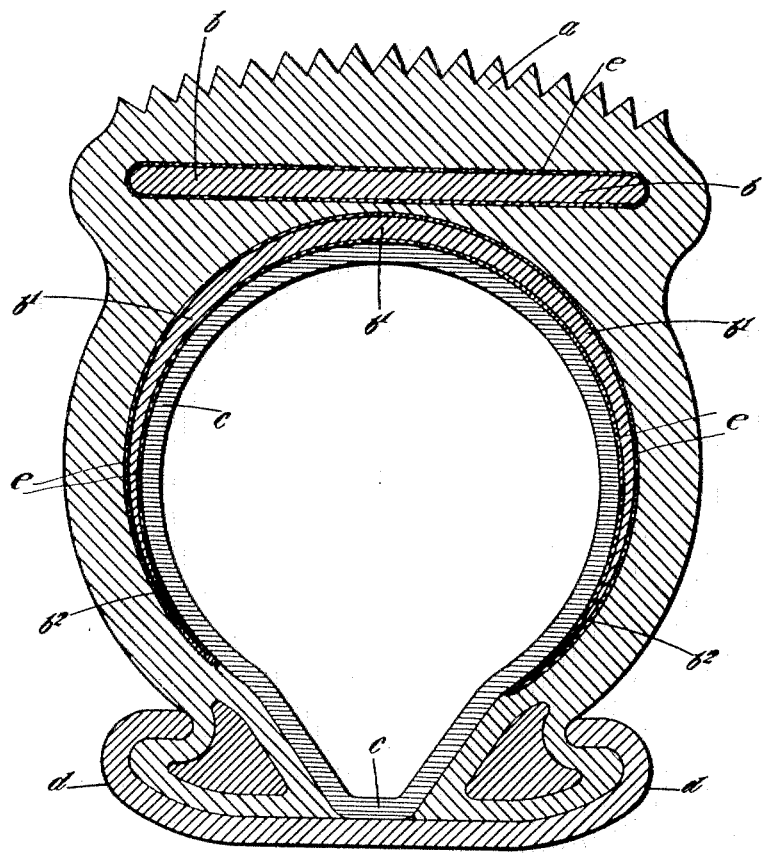

UNITED STATES PATENT OFFICE.

ARTHUR ALEXANDER CROZIER, OF LONDON, ENGLAND.

PROCESS FOR MAKING PNEUMATIC TIRES.

1,315,710.   Specification of Letters Patent.   Patented Sept. 9, 1919.

Application filed March 7, 1917. Serial No. 153,080.

*To all whom it may concern:*

Be it known that I, ARTHUR ALEXANDER CROZIER, of London, England, residing at 3 Woodquest avenue, in the county of London, England, have invented certain new and useful Improvements in Processes for Making Pneumatic Tires; and I do hereby declare the following to be a full, clear, and exact description of the invention, such as will enable others skilled in the art to which it appertains to make and use the same.

This invention relates to improvements in processes for making pneumatic tires for the wheels of motor cars, motor cabs, motor ambulance cars, motor transport cars, armored motor cars, motor cycles, field kitchens and other vehicles.

The object of the invention is to provide a pneumatic tire which will not be liable to become punctured or burst when in use, and which will be resilient and cheap to manufacture, and far more durable, and give a much greater mileage than the ordinary pneumatic tire.

The invention is illustrated by the accompanying drawing which represents a transverse section of a type of flat treaded tire, which is most suitable for applying the invention.

In carrying the invention into effect I form a tire of caoutchouc of any suitable diameter in cross section having a flattened tread $a$, of any suitable width and form and within the substance of the tread I locate a specially prepared flat band $b$, of the material commercially known as rawhide of any convenient width which may be cemented with any suitable adhesive within an annular cavity formed in the substance of the flattened tread $a$, and will protect the internal compressed air space of the tire or inner tube $c$, from puncture through the tread. I also locate by cementing with any suitable adhesive a specially prepared band $b'$ of the material commercially known as rawhide around substantially the internal surface of the tire by means of which the sides of the tire will be protected from puncture and the tread of the tire will be additionally protected thereby.

It is necessary to extract the free oil out of the rawhide before applying it to the tire, to prevent such free oil gradually oozing out of the rawhide in the course of time and acting on and deteriorating the caoutchouc part or outer cover of the tire, and I have found by experience that gradually sweating or heating such rawhide in order to extract the free oil therefrom destroys or lessens the flexibility of the rawhide to some extent, and any heating process hardens the rawhide and tends to make it brittle, and it is essential that the rawhide should retain all its peculiar advantages of toughness and flexibility, so as to resist punctures and at the same time not deaden or lessen the "life" or resiliency of the tire, and I prepare the rawhide for use in the tire in the following manner:

The ordinary rawhide of commerce is first soaked in a bath of cold benzol for about fifteen minutes, and is then pressed lightly between steel or other rollers in order to remove or press out the greater part of the benzol which it has absorbed, and to compress the grain or pores of the rawhide, and the free oil contained in the rawhide comes away at the same time and mixed with the benzol. The rawhide is then hung up in the open air for about twelve hours so that the remaining benzol will evaporate, after which French chalk (a silicate of magnesium) is well rubbed into both sides, or all surfaces, it is then coated on both sides or all surfaces with a solution of chloroform and gutta percha and again hung up in the open air for a sufficient time to allow the chloroform to evaporate and leave a thin coating of gutta percha on both sides or all surfaces of the rawhide which is then again pressed slightly by means of suitable rollers and then covered on both sides or all surfaces with a thin sheet of unvulcanized caoutchouc which may be cemented on by any suitable adhesive, and then both sides or all surfaces are covered with thin canvas $e$ or any suitable fabric which is previously impregnated with balata and allowed to dry, when it is cemented over the unvulcanized caoutchouc by means of any suitable adhesive, and when dry the prepared rawhide may be located within the substance of the tread $a$, and also applied around the internal surface of the tire by means of any suitable adhesive, so as to form one mass which will not be liable to become punctured, and will be unaffected by water entering any cuts or punctures made in the caoutchouc or rubber of the outer cover of the tire by sharp obstacles on the road, and this specially prepared rawhide will not rot like canvas or other fabric employed in the manufacture of pneumatic tires, and being extremely strong but flexible the tire is not liable to burst, and by means of this specially prepared rawhide an additional thickness of puncture resisting material will be located under the hereinbefore described puncture resisting band b, in the flat tread a, of the tire.

The improved tire may be made as a detachable tire having an inner tube c, and connected to the standard type of wheel rim d.

I claim as my invention:

1. A process for manufacturing pneumatic tires, comprising pressing rawhide which has been previously treated with benzol to remove simultaneously the greater part of the benzol and the free oil contained in the rawhide, then exposing the rawhide so treated to the open air, then rubbing magnesium silicate over the surface of the rawhide, then coating the rawhide so treated with a solution of chloroform and gutta percha, again exposing the rawhide and its covering to the open air, pressing it again, then covering the gutta percha surfaces with a sheet of unvulcanized caoutchouc, covering the unvulcanized caoutchouc surfaces with fabric treated with gum, and forming the product into a tire, substantially as and for the purposes described.

2. A process for manufacturing pneumatic tires, comprising pressing rawhide which has been previously treated with benzol to remove simultaneously the greater part of the benzol and the free oil contained in the rawhide, then exposing the rawhide so treated to the open air, then rubbing magnesium silicate over the surface of the rawhide, then coating the rawhide so treated with a solution of chloroform and gutta percha, again exposing the rawhide and its covering to the open air, pressing it again, then covering the gutta percha surfaces with a sheet of unvulcanized caoutchouc, covering the unvulcanized caoutchouc surfaces with canvas which has previously been impregnated with balata, and forming the product into a tire, substantially as and for the purposes described.

In testimony whereof, I affix my signature.

ARTHUR ALEXANDER CROZIER.